United States Patent
Halbritter

(10) Patent No.: US 10,236,987 B2
(45) Date of Patent: Mar. 19, 2019

(54) CIRCUIT ARRANGEMENT, LIGHT-EMITTING DIODE ASSEMBLY, AND METHOD OF ACTUATING AN OPTOELECTRONIC COMPONENT

(71) Applicant: OSRAM Opto Semiconductors GmbH, Regensburg (DE)

(72) Inventor: Hubert Halbritter, Dietfurt-Toeging (DE)

(73) Assignee: OSRAM Opto Semiconductors GmbH (DE)

( * ) Notice: Subject to any disclaimer, the term of this patent is extended or adjusted under 35 U.S.C. 154(b) by 72 days.

(21) Appl. No.: 15/030,118

(22) PCT Filed: Oct. 22, 2014

(86) PCT No.: PCT/EP2014/072674
§ 371 (c)(1),
(2) Date: Apr. 18, 2016

(87) PCT Pub. No.: WO2015/059204
PCT Pub. Date: Apr. 30, 2015

(65) Prior Publication Data
US 2016/0269120 A1 Sep. 15, 2016

(30) Foreign Application Priority Data
Oct. 25, 2013 (DE) .................... 10 2013 221 753

(51) Int. Cl.
*H05B 33/08* (2006.01)
*H04B 10/50* (2013.01)

(52) U.S. Cl.
CPC ......... *H04B 10/502* (2013.01); *H05B 33/089* (2013.01); *H05B 33/0815* (2013.01)

(58) Field of Classification Search
CPC . H04B 10/502; H05B 33/0815; H05B 33/089
See application file for complete search history.

(56) References Cited

U.S. PATENT DOCUMENTS

| 4,864,193 A | * | 9/1989 | Takada | H04B 10/502 315/71 |
| 5,140,175 A | * | 8/1992 | Yagi | H03K 17/04126 327/109 |

(Continued)

FOREIGN PATENT DOCUMENTS

| DE | 102 41 045 A1 | 3/2004 |
| DE | 603 17 865 T2 | 11/2008 |
| WO | 2007/141741 A1 | 12/2007 |

OTHER PUBLICATIONS

First Office Action dated Jan. 25, 2017, of corresponding Chinese Application No. 201480058558.3 in English.

(Continued)

*Primary Examiner* — Alexander H Taningco
*Assistant Examiner* — Kurtis R Bahr
(74) *Attorney, Agent, or Firm* — DLA Piper LLP (US)

(57) ABSTRACT

A circuit arrangement that actuates an optoelectronic component includes a first node, a second node, a third node, and a fourth node, wherein a supply voltage may be applied between the first node and the fourth node, the first node connects to the second node, an optoelectronic component is optionally arranged between the second node and the third node, a first transistor is arranged between the third node and the fourth node to switch a channel between the third node and the fourth node, and a series circuit including a first resistor, a coil and a second transistor is arranged between the first node and the third node.

11 Claims, 3 Drawing Sheets

(56) References Cited

U.S. PATENT DOCUMENTS

| | | | | |
|---|---|---|---|---|
| 5,919,134 A | * | 7/1999 | Diab | A61B 5/14551 |
| | | | | 600/323 |
| 6,169,765 B1 | * | 1/2001 | Holcombe | H03K 5/1565 |
| | | | | 327/26 |
| 8,729,870 B2 | * | 5/2014 | Crawford | H05B 33/0815 |
| | | | | 315/291 |
| 2006/0290298 A1 | * | 12/2006 | Kang | G09G 3/3406 |
| | | | | 315/291 |
| 2011/0012522 A1 | * | 1/2011 | Cheng | H05B 33/0815 |
| | | | | 315/224 |
| 2011/0204802 A1 | * | 8/2011 | Welten | H05B 33/0815 |
| | | | | 315/193 |
| 2012/0032613 A1 | | 2/2012 | Liu et al. | |
| 2013/0069546 A1 | | 3/2013 | Lin et al. | |
| 2013/0264964 A1 | * | 10/2013 | Luo | H05B 33/0818 |
| | | | | 315/289 |
| 2014/0312233 A1 | * | 10/2014 | Mark | G01J 1/46 |
| | | | | 250/341.8 |

OTHER PUBLICATIONS

Third Office Action dated Jan. 19, 2018, of corresponding Chinese Application No. 201480058558.3 in English.

* cited by examiner

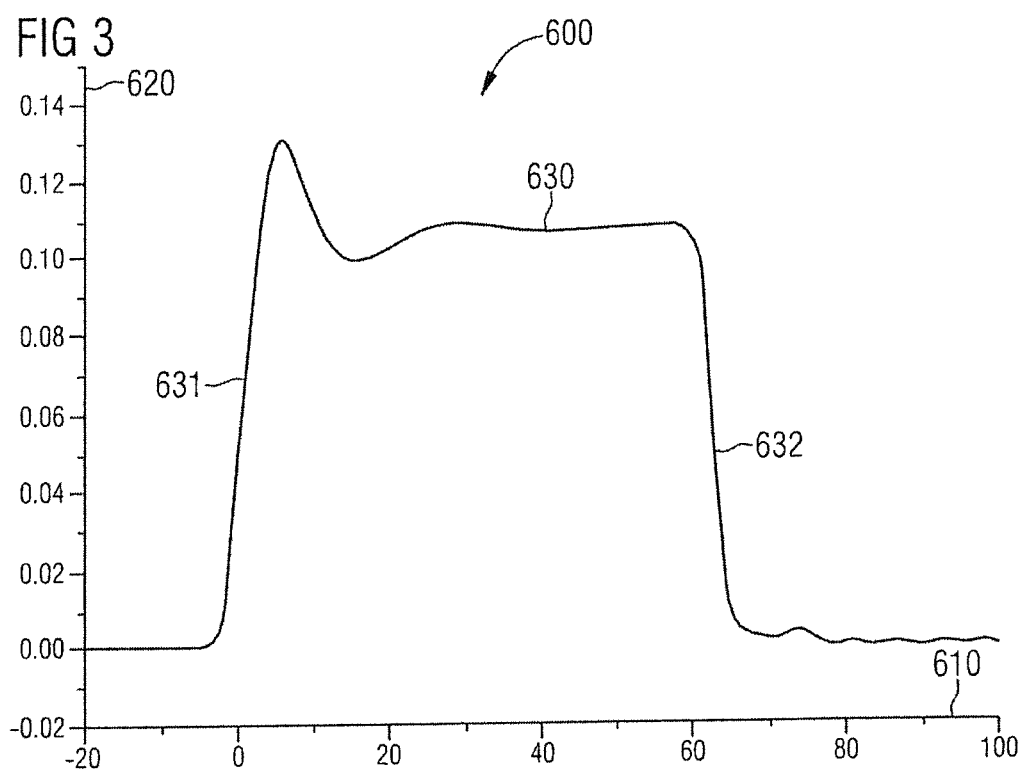
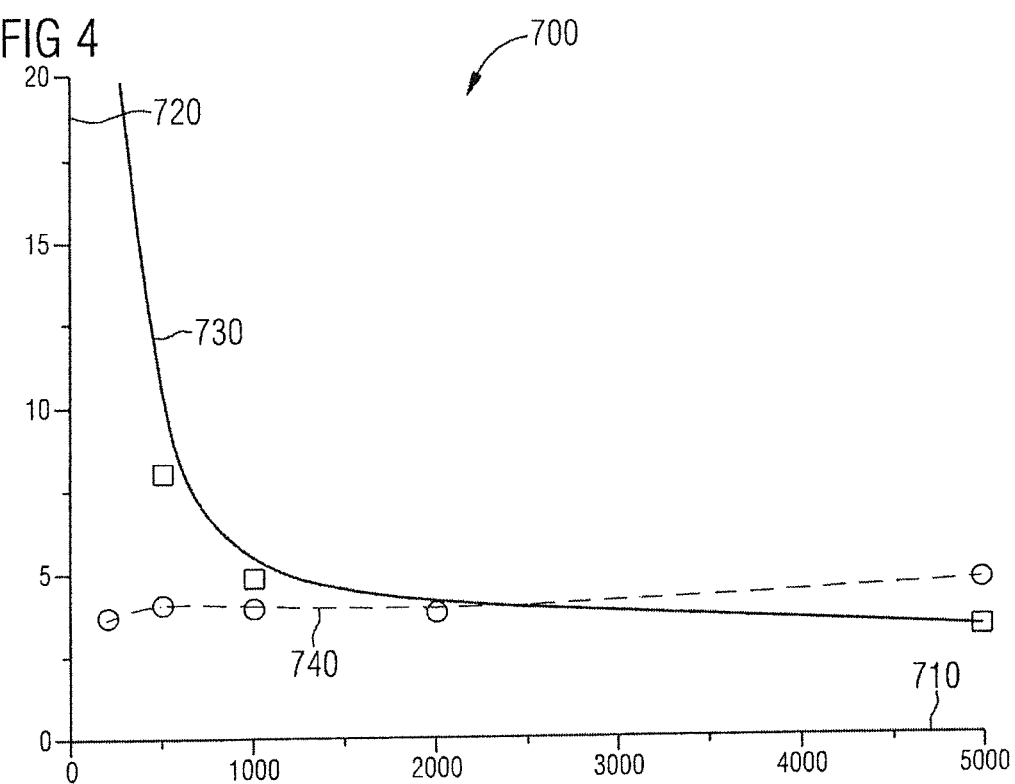

CIRCUIT ARRANGEMENT, LIGHT-EMITTING DIODE ASSEMBLY, AND METHOD OF ACTUATING AN OPTOELECTRONIC COMPONENT

TECHNICAL FIELD

This disclosure relates to a circuit arrangement, a light-emitting diode assembly, and a method of actuating an optoelectronic component by a circuit arrangement.

BACKGROUND

Circuit arrangements that actuate optoelectronic components such as light-emitting diodes and semiconductor lasers are known. In pulsed-operation optoelectronic components, short switching times are desirable in many applications. When actuating light-emitting diodes, switching times often result which are significantly longer than switching times achievable using laser diodes. This applies in particular to high-power light-emitting diodes and light-emitting diodes provided for emission of electromagnetic radiation in the infrared spectral range. This results in limitations in the potential application fields of light-emitting diodes.

It could therefore be helpful to provide a circuit arrangement to actuate an optoelectronic component, a light-emitting diode assembly, and a method of actuating an optoelectronic component by a circuit arrangement.

SUMMARY

I provide a circuit arrangement that actuates an optoelectronic component including a first node, a second node, a third node, and a fourth node, wherein a supply voltage may be applied between the first node and the fourth node, the first node connects to the second node, an optoelectronic component is optionally arranged between the second node and the third node, a first transistor is arranged between the third node and the fourth node to switch a channel between the third node and the fourth node, and a series circuit including a first resistor, a coil and a second transistor is arranged between the first node and the third node.

I also provide a light-emitting diode assembly including the circuit arrangement that actuates an optoelectronic component including a first node, a second node, a third node, and a fourth node, wherein a supply voltage may be applied between the first node and the fourth node, the first node connects to the second node, an optoelectronic component is optionally arranged between the second node and the third node, a first transistor is arranged between the third node and the fourth node to switch a channel between the third node and the fourth node, and a series circuit including a first resistor, a coil and a second transistor is arranged between the first node and the third node, and a light-emitting diode arranged between the second node and the third node of the circuit arrangement.

I further provide a method of actuating an optoelectronic component by the circuit arrangement that actuates an optoelectronic component including a first node, a second node, a third node, and a fourth node, wherein a supply voltage may be applied between the first node and the fourth node, the first node connects to the second node, an optoelectronic component is optionally arranged between the second node and the third node, a first transistor is arranged between the third node and the fourth node to switch a channel between the third node and the fourth node, and a series circuit including a first resistor, a coil and a second transistor is arranged between the first node and the third node, including turning on the first transistor at a first point in time, turning on the second transistor at a second point in time after the first point in time, and turning off the first transistor at a third point in time after the second point in time.

BRIEF DESCRIPTION OF THE DRAWINGS

FIG. 3 shows a pulse profile diagram.

FIG. 4 shows a switching speed diagram.

LIST OF REFERENCE NUMERALS

Figure 1:
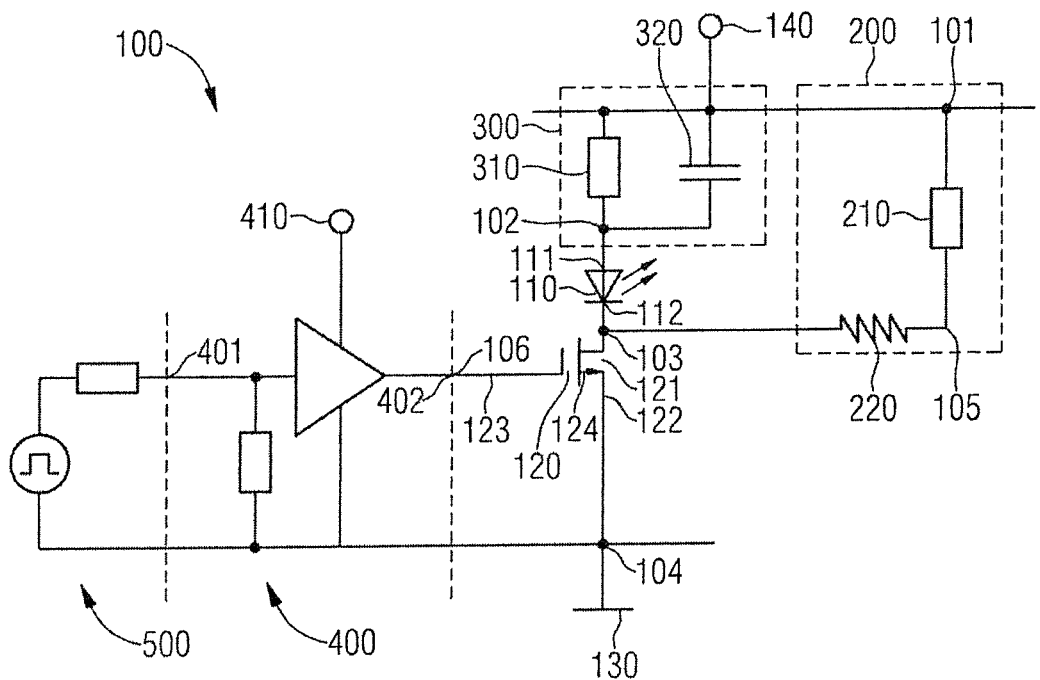
FIG. 1 shows a circuit arrangement that actuates an optoelectronic component.

100 Circuit arrangement
101 First node
102 Second node
103 Third node
104 Fourth node
105 Fifth node
106 Sixth node
107 Seventh node
110 Light-emitting diode
111 Anode
112 Cathode
115 Protective diode
116 Anode
117 Cathode
120 First transistor
121 Drain contact
122 Source contact
123 Gate contact
124 Channel
130 Ground contact
140 Supply voltage
200 Discharge circuit
210 First resistor
220 Coil
230 Second transistor
231 Drain contact
232 Source contact
233 Gate contact
300 Overcurrent circuit
310 Second resistor
320 Capacitor
400 Driver circuit
401 Input
402 Output
410 Driver voltage
500 Pulse generator
600 Pulse profile diagram
610 Time
620 Optical intensity
630 Intensity profile
631 Rising edge
632 Falling edge
700 Switching speed diagram
710 Current strength
720 Edge duration
730 Rise time profile 740 Fall time profile
800 Circuit arrangement
900 Switching diagram
910 Time
911 First point in time
912 Second point in time
913 Third point in time
914 Fourth point in time
915 Time interval
920 Driver signal
930 Discharge signal
940 Discharge current

DETAILED DESCRIPTION

My circuit arrangement that actuates an optoelectronic component has a first node, a second node, a third node, and a fourth node. A supply voltage may be applied between the first node and the fourth node. The first node connects to the second node. An optoelectronic component may be arranged between the second node and the third node. A first transistor is arranged between the third node and the fourth node to switch a channel between the third node and the fourth node. A series circuit including a first resistor and a coil is arranged between the first node and the third node. This circuit arrangement may be used to actuate an optoelectronic component arranged between the second node and the third node. The optoelectronic component may, for example, be a light-emitting diode. The first transistor of the circuit arrangement may be used to switch the optoelectronic component. When turning off the optoelectronic component by the first transistor of the circuit arrangement, a current flow is maintained through the coil of the series circuit between the first node and the third node for a brief period of time, which flows into the optoelectronic component against the current direction during the operation of the optoelectronic component, and there effects a reduction of charge carriers in an active zone. As a result, a significant shortening of the optical turn-off time of the optoelectronic component is advantageously achieved.

The series circuit arranged between the first node and the third node may include a second transistor. The second transistor may be turned off while the first transistor is on and the optoelectronic component arranged between the second and the third node of the circuit arrangement is thus turned on. The second transistor in the series circuit of the circuit arrangement may be turned on only shortly before turning off the optoelectronic component to make possible a current flow through the series circuit serving to discharge the optoelectronic component. Advantageously, a current flow via the series circuit of the circuit arrangement takes place only during a short period of time in this case. Therefore, energy consumption of the circuit arrangement is reduced.

The second transistor may be designed as a normally off p-channel field-effect transistor. Advantageously, no control signal has to be applied to the second transistor to keep the second transistor in a non-conductive state.

The first transistor may be designed as a normally off n-channel field-effect transistor. Advantageously, in this case as well, no control signal has to be applied to the first transistor to keep the first transistor off.

The first node may connect to the second node via a parallel circuit made up of a second resistor and a capacitor. The parallel circuit made up of the second resistor and the capacitor effects an excessive increase in a current, which flows into an optoelectronic component arranged between the second node and the third node of the circuit arrangement after the first transistor switches to a conductive state. As a result, the optoelectronic component is turned on more quickly after the first transistor switches to a conductive state, whereby an optical rise time of the optoelectronic component actuated by the circuit arrangement is advantageously shortened.

The circuit arrangement may include a driver circuit to actuate the first transistor. The driver circuit may, for example, be designed as an FET driver circuit.

My light-emitting diode assembly includes a circuit arrangement of the aforementioned kind and a light-emitting diode arranged between the second node and the third node of the circuit arrangement. Advantageously, the light-emitting diode of this light-emitting diode assembly may be switched by the circuit arrangement of the light-emitting diode assembly. Advantageously, short optical rise and fall times of the light-emitting diode may thus be achieved.

The light-emitting diode may be designed to emit light in the infrared spectral range. The light-emitting diode may, for example, be a high-power light-emitting diode and provided for a current flow of more than 1 A. Advantageously, the light-emitting diode assembly is thereby suitable for use in application areas otherwise reserved for semiconductor lasers. The light-emitting diode assembly thus provides the advantages of lower costs, lower risks of injury to people, and simplified light shaping.

A protective diode may be arranged between the second node and the third node, antiparallel to the light-emitting diode. Advantageously, the protective diode may protect the light-emitting diode of the light-emitting diode assembly from damage due to electrostatic discharges. The protective diode may also protect the light-emitting diode of the light-emitting diode assembly from damage due to a discharge current flowing from the coil of the series circuit of the circuit arrangement into the light-emitting diode in the case of turn-off.

A method of actuating an optoelectronic component by a circuit arrangement is useful when using a circuit arrangement of the aforementioned kind, in which the series circuit arranged between the first node and the third node includes a second transistor. In this regard, the method includes steps of turning on the first transistor at a first point in time, turning on the second transistor at a second point in time after the first point in time, and turning off the first transistor at a third point in time after the second point in time. After the second transistor turns on at the second point in time, a current flow results through the series circuit of the circuit arrangement including the first resistor and the coil. This current flow is still maintained through the coil for a certain time even after the first transistor turns off at the third point in time. The maintained electric current then flows into the optoelectronic component in the direction opposite to the current flowing through the optoelectronic component during operation, and thereby effects a reduction of charge carriers in an active zone of the optoelectronic component. As a result, an optical turn-off time of the optoelectronic component is advantageously shortened.

There may be a time interval between the second point in time and the third point in time which is at least three times larger than a time constant determined by a quotient of the inductance of the coil and the resistance of the first resistor. Advantageously, a current flow, which results in the series circuit at the second point in time after the second transistor turns off, has then already reached a maximum value at the third point in time, whereby a particularly effective discharge of the active zone of the optoelectronic component is achieved after the first transistor turns off at the third point in time.

The method may comprise an additional step of turning off the second transistor at a fourth point in time after the third point in time. Advantageously, by turning off the second transistor at the fourth point in time, energy consumption of the circuit arrangement is reduced.

The characteristics, features, and advantages described above, as well as the manner in which they are achieved will be more clearly and explicitly understandable in connection with the following description of examples explained in greater detail in connection with the drawings.

FIG. 1 shows a partially schematized depiction of a circuit arrangement 100 that actuates an optoelectronic component. The circuit arrangement 100 is suitable, for example, to actuate light-emitting diodes. The circuit arrangement 100 is suitable in particular for a pulsed operation of an optoelectronic component to be actuated. The circuit arrangement 100 is suitable, for example, for use in a device for electronic data transmission and for use in a 3D camera.

The circuit arrangement 100 includes a first node 101, a second node 102, a third node 103, a fourth node 104, a fifth node 105, and a sixth node 106. The nodes 101, 102, 103, 104, 105, 106 of the circuit arrangement 100 are circuit nodes of the circuit arrangement 100.

An optoelectronic component to be actuated via the circuit arrangement 100, for example, a light-emitting diode 110, may be arranged between the second node 102 and the third node 103 of the circuit arrangement 100. The light-emitting diode 110 may, for example, emit light in the infrared spectral range. The light-emitting diode 110 may be a high-power light-emitting diode and designed for a current flow of more than 1 A. For example, the light-emitting diode 110 may be designed for a current flow of 2 A.

The light-emitting diode 110 may be arranged between second node 102 and the third node 103 such that an anode 111 of the light-emitting diode 110 connects to the second node 102 of the circuit arrangement 100, and a cathode 112 of the light-emitting diode 110 connects to the third node 103 of the circuit arrangement 100.

A supply voltage 140 may be applied between the first node 101 and the fourth node 104 of the circuit arrangement 100. The fourth node 104 of the circuit arrangement 100 may connect to a ground contact 130. The supply voltage 140 is a positive electrical DC voltage and is used to supply the light-emitting diode 110.

A first transistor 120 is arranged between the third node 103 and the fourth node 104 of the circuit arrangement 100 to switch the light-emitting diode 110. The first transistor 120 may, for example, be a normally off n-channel field-effect transistor. Preferably, the first transistor 120 is a transistor having short switching times.

A drain contact 121 of the first transistor 120 connects to the third node 103 of the circuit arrangement 100. A source contact 122 of the first transistor 120 connects to the fourth node 104 of the circuit arrangement 100. A gate contact 123 of the first transistor 120 connects to the sixth node 106 of the circuit arrangement 100.

An electrically conductive channel 124 may be switched between the drain contact 121 and the source contact 122 of the first transistor 120 by a control signal applied to the gate contact 123 of the first transistor 120 at the sixth node 106. Thus, an electrically conductive connection may be switched between the third node 103 and the fourth node 104 of the circuit arrangement 100. If the first transistor 120 is switched to an electrically conductive state, a current flow is possible through the light-emitting diode 110 and the light-emitting diode 110 is turned on. If the first transistor 120 is switched to an electrically non-conductive state, no current is able to flow through the light-emitting diode 110, and the light-emitting diode 110 is turned off. If the first transistor 120 is a normally off transistor, the first transistor 120 is in a non-conductive state if no control signal is applied to the gate contact 123.

The circuit arrangement 100 includes a driver circuit 400. The driver circuit 400 has an input 401 and an output 402. The output 402 of the driver circuit 400 connects to the sixth node 106 of the circuit arrangement 100. A driver voltage 410 may be applied to the driver circuit 400. The driver circuit 400 may, for example, be an FET driver circuit.

Furthermore, the circuit arrangement 100 includes a pulse generator 500. The pulse generator 500 connects to the input 401 of the driver circuit 400. The pulse generator 500 generates short voltage pulses. The voltage pulses generated by the pulse generator 500 and applied to the input 401 of the driver circuit 400 are amplified by the driver circuit 400 and applied to the gate contact 123 of the first transistor 120 of the circuit arrangement 100 as a control signal via the output 402 of the driver circuit 400. The voltage pulses generated by the pulse generator 500 may, for example, have a pulse duration in the range of some 10 ns.

If the first transistor 120 of the circuit arrangement 100 is switched from the non-conductive state to the conductive state, a rise time passes until the light-emitting diode 110 emits electromagnetic radiation at full optical intensity. If the first transistor 120 of the circuit arrangement 100 is switched from the conductive state to the non-conductive state, a fall time passes until emission of electromagnetic radiation by the light-emitting diode 110 has completely subsided. If the supply voltage 140 connects to the anode 111 of the light-emitting diode 110 via a series resistor without additional circuit components, the rise time for a provided current strength of 2 A flowing through the light-emitting diode 110 could be, for example, 10 ns. In this case, the fall time could be, for example, 15 ns. These switching times are longer than possible switching times in semiconductor laser diodes. For various application cases, shorter switching times of the light-emitting diode 110 are desirable.

The circuit arrangement 100 includes a discharge circuit 200 that shortens the fall time of the light-emitting diode 110. The discharge circuit 200 effects an accelerated reduction of free charge carriers in an active zone of the light-emitting diode 110, after switching the first transistor 120 from the conductive state to the non-conductive state to accelerate the turning off of the light-emitting diode 110.

The discharge circuit 200 includes a series circuit made up of a first resistor 210 and a coil 220. The first resistor 210 is arranged between the first node 101 of the circuit arrangement 100 and the fifth node 105 of the circuit arrangement 100. The coil 220 is arranged between the fifth node 105 and the third node 103 of the circuit arrangement 100. Of course, the sequence of the first resistor 210 and the coil 220 in the series circuit forming the discharge circuit 200 could be exchanged. The first resistor 210 may, for example, have a resistance of 2.2 ohms. The coil 220 may, for example, have an inductance of 10 nH.

If the first transistor 120 of the circuit arrangement 100 is in a conductive state, an electric current flows between the first node 101 and the third node 103 of the circuit arrangement 100 via the discharge circuit 200, through the first resistor 210 and the coil 220. If the first transistor 120 is switched from the electrically conductive state to the non-conductive state, the coil 220 initially effects a maintenance of the electric current flowing through the coil 220. Since this electric current is no longer able to flow via the channel 124 of the first transistor 120, which is now off, the current maintained via the coil 220 of the discharge circuit 200 flows into the light-emitting diode 110 in the blocking direction and effects a reduction of free charge carriers in the active zone in the light-emitting diode 110. As a result, an emission of electromagnetic radiation by the light-emitting diode 110 is very quickly terminated. The discharge circuit 200 may, for example, effect a reduction of the fall time of the light-emitting diode 110 to a value of less than 5 ns, in particular to a value of less than 4 ns.

To reduce the rise time of the light-emitting diode 110, the circuit arrangement 100 includes an overcurrent circuit 300. The overcurrent circuit 300 comprises a parallel circuit made up of a second resistor 310 and a capacitor 320. The parallel circuit made up of the second resistor 310 and the capacitor 320 forming the overcurrent circuit 300 is arranged between the first node 101 of the circuit arrangement 100 and the second node 102 of the circuit arrangement 100. The second resistor 310 may, for example, have a resistance of 2.7 ohms. The capacitor 320 may, for example, have a capacitance of 2.2 nF.

If the first transistor 120 of the circuit arrangement 100 is in an electrically non-conductive state, the capacitor 320 of the overcurrent circuit 300 is discharged. If the transistor 120 of the circuit arrangement 100 is switched from the non-conductive state to the conductive state, an electric current flow via the overcurrent circuit 300, the light-emitting diode 110, and the channel 124 of the first transistor 120, is made possible. In this case, a current flow is possible in the overcurrent circuit 300 both via the second resistor 310 and via the capacitor 320, which is not yet fully charged. As a result, during a first period of time immediately after the first transistor 120 switches from the non-conductive state to the conductive state, a higher current flow is possible via the parallel circuit made up of the second resistor 310 and the capacitor 320, which forms the overcurrent circuit 300, than would be possible in the case of only the second resistor 310 being present.

As soon as the capacitor 320 is fully charged, a current flow is essentially still possible only via the second resistor 310 of the overcurrent circuit 300. The magnitude of the electric current flowing through the overcurrent circuit 300 and through the light-emitting diode 110 is then determined via the resistance of the second resistor 310 of the overcurrent circuit 300.

The increased current flow enabled in the first period of time after the transistor 120 switches from the non-conductive state to the conductive state via the overcurrent circuit 300 effects an accelerated enrichment of free charge carriers in the active zone of the light-emitting diode 110 and thus an accelerated start of an emission of electromagnetic radiation via the light-emitting diode 110. As a result, the overcurrent circuit 300 makes a shortening of the rise time of the light-emitting diode 110 possible. For example, the overcurrent circuit 300 may enable a shortening of the rise time of the light-emitting diode 110 to a value of less than 5 ns, in particular to a value of less than 4 ns.

Figure 2:
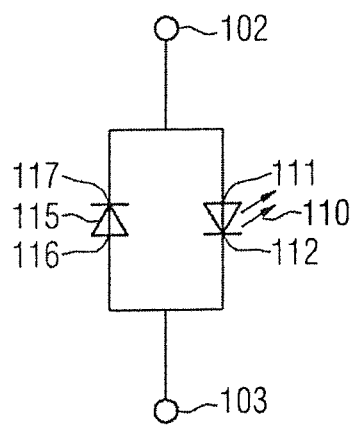
FIG. 2 shows a parallel circuit made up of a light-emitting diode and a protective diode.

A protective diode 115 may connect in parallel with the light-emitting diode 110 arranged between the second node 102 and the third node 103 of the circuit arrangement 100. This is shown in FIG. 2. The protective diode 115 has an anode 116 and a cathode 117. The protective diode 115 is arranged antiparallel to the light-emitting diode 110. Thus, the anode 111 of the light-emitting diode 110 connects to the cathode 117 of the protective diode 115 and to the second node 102 of the circuit arrangement 100. The cathode 112 of the light-emitting diode 110 connects to the anode 116 of the protective diode 115 and to the third node 103 of the circuit arrangement 100.

The protective diode 115 is used for protection of the light-emitting diode 110. For example, the protective diode 115 may protect the light-emitting diode 110 from damage due to electrostatic discharges. The protective diode 115 may also protect the light-emitting diode 110 from damage due to the discharge current flowing from the discharge circuit 200 into the light-emitting diode 110 in the case of turn-off.

The light-emitting diode 110 and the protective diode 115 may be an integrated electric component.

FIG. 3 shows a schematized pulse profile diagram 600. Time 610 is plotted in ns on a horizontal axis of the pulse profile diagram. An optical intensity 620 is plotted in arbitrary units on a vertical axis of the pulse profile diagram 600. The pulse profile diagram 600 shows a temporal intensity profile 630 of an intensity of electromagnetic radiation emitted by the light-emitting diode 110 during a short pulse.

The light-emitting diode 110 is actuated by the circuit arrangement 100 of FIG. 1. The pulse generator 500 and the driver circuit 400 of the circuit arrangement 100 generate a control signal to switch the first transistor of the circuit arrangement 100 from the non-conductive state to the conductive state at the start of the pulse and from the conductive state to the non-conductive state at the end of the pulse.

At the start of the pulse, the intensity of the electromagnetic radiation emitted by the light-emitting diode 110 increases steeply on a rising edge 631 of the intensity profile 630. At the end of the pulse, the intensity of the electromagnetic radiation emitted by the light-emitting diode 110 decreases steeply on a falling edge 632 of the intensity profile 630. The duration of the rising edge 631 corresponds to the rise time of the light-emitting diode 110 and may be shorter than 5 ns, preferably even shorter than 4 ns. The duration of the falling edge 632 of the intensity profile 630 constitutes the fall time of the light-emitting diode 110 and may be shorter than 5 ns, preferably even shorter than 4 ns.

FIG. 4 shows a schematized switching speed diagram 700 illustrating the dependence of the switching times of the light-emitting diode 110 on the current strength of the current flowing through the light-emitting diode 110 during operation in actuation of the light-emitting diode 110 via the circuit arrangement 100. The current strength 710 of the current flowing through the light-emitting diode 110 in the on-state is plotted in mA on a horizontal axis of the switching speed diagram 700. The edge durations 720 of the rising edge 631 and the falling edge 632, i.e., the rise time and the fall time of the light-emitting diode 110, are plotted on a vertical axis of the switching speed diagram 700.

A rise time profile 730 illustrates the dependence of the rise time on the current strength 710. A fall time profile 740 indicates the dependence of the fall time of the light-emitting diode 110 on the current strength 710. The rise time of the light-emitting diode 110 decreases with increasing current strength 710. The fall time of the light-emitting diode 110 increases slightly with increasing current strength 710. In a current strength 710 of 2 A, both the rise time and the fall time of the light-emitting diode 110 are less than 5 ns.

Figure 5:
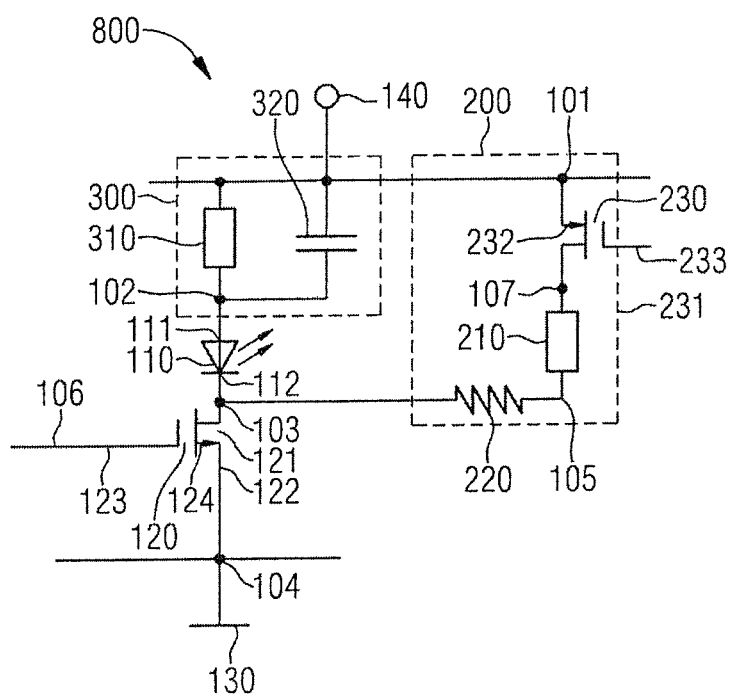
FIG. 5 shows a portion of an additional circuit arrangement.

FIG. 5 shows a schematized depiction of a portion of a circuit arrangement 800 that actuates an optoelectronic component. The circuit arrangement 800 largely corresponds to the circuit arrangement 100 of FIG. 1. Corresponding components are provided with the same reference numerals in FIGS. 1 and 5 and are not described again in detail below. Only the differences between the circuit arrangement 800 of FIG. 5 and the circuit arrangement 100 of FIG. 1 are explained below.

The circuit arrangement 800 differs from the circuit arrangement 100 in that the series circuit arranged between the first node 101 and the third node 103 and forming the discharge circuit 200 additionally includes a second transistor 230 in addition to the first resistor 210 and the coil 220. The second transistor 230 may, for example, be a normally off p-channel field-effect transistor. The second transistor 230 has a drain contact 231, a source contact 232, and a gate contact 233. A channel between the drain contact 231 and the source contact 232 may be switched between a non-conductive state and an electrically conductive state by a control signal applied to the gate contact 233.

The source contact 232 of the second transistor 230 connect to the first node 101 of the circuit arrangement 800. The drain contact 231 of the second transistor 230 connects to a seventh node 107 of the circuit arrangement 800. The first resistor 210 of the discharge circuit 200 of the circuit arrangement 800 is arranged between the seventh node 107 and the fifth node 105 of the circuit arrangement 800. The coil 220 is arranged between the fifth node 105 and the third node 103 of the circuit arrangement 800. Of course, the sequence of the first resistor 210, the coil 220, and the second transistor 230 in the series circuit forming the discharge circuit 200 of the circuit arrangement 800 could also be chosen differently.

The second transistor 230 of the discharge circuit 200 of the circuit arrangement 800 of FIG. 5 which is additional with respect to the circuit arrangement 100 of FIG. 1 is used to reduce energy consumption of the circuit arrangement 800 with respect to that of the circuit arrangement 100. The second transistor 230 of the discharge circuit 200 of the circuit arrangement 800 may be switched to a non-conductive state at least during a portion of a time during which the first transistor 120 of the circuit arrangement 800 is switched to a conductive state and the light-emitting diode 110 is turned on. Therefore, during this period of time, no electric current is able to flow via the series circuit made up of the first resistor 210, the coil 220, and the second transistor 230 forming the discharge circuit 200. Thus, the energy consumption of the circuit arrangement 800 is reduced.

Before the first transistor 120 is switched from the conductive state to the non-conductive state to turn off the light-emitting diode 110, the second transistor 230 of the discharge circuit 200 of the circuit arrangement 800 is initially switched from the non-conductive state to the conductive state. As a result, a current flow may develop via the series circuit forming the discharge circuit 200. After the first transistor 120 switches from the conductive state to the non-conductive state, this current flow is initially maintained through the coil 220 and flows as discharge current into the light-emitting diode 110 to accelerate a turning off of the light-emitting diode 110 in the manner already described. Subsequently, the second transistor 230 of the discharge circuit 200 may also be switched again from the conductive state to the non-conductive state.

Figure 6:
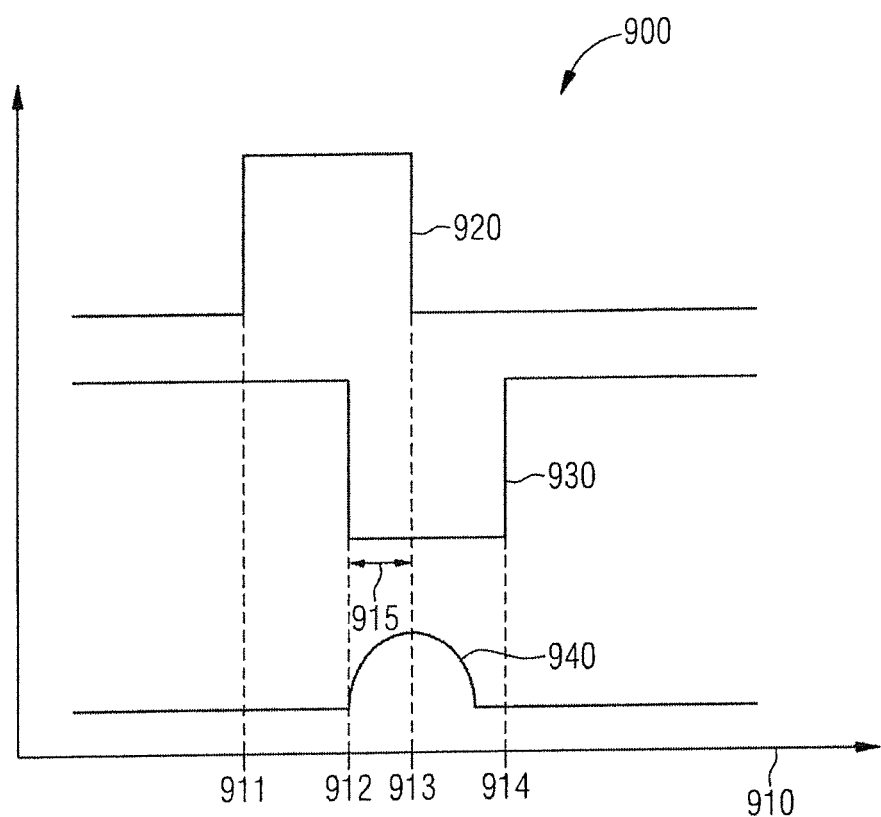
FIG. 6 shows a switching diagram.

FIG. 6 shows a schematic switching diagram 900 to illustrate the described switching signal sequence. Time 910 is plotted on a horizontal axis of the switching diagram 900. A driver signal 920 applied to the gate contact 123 of the first transistor 120 of the circuit arrangement 800, a discharge signal 930 applied to the gate contact 233 of the second transistor 230 of the discharge circuit 200 of the circuit arrangement 800, and a discharge current 940 flowing in the coil 220 of the discharge circuit 200 of the circuit arrangement 800, are plotted on vertical axes of the switching diagram 900 in respectively arbitrary units.

At a first point in time 911, the first transistor 120 of the circuit arrangement 800 is switched from the non-conductive state to the conductive state by the driver signal 920. As a result, the light-emitting diode 110 is turned on and emits electromagnetic radiation. At a third point in time 913 subsequent to the first point in time 911, the first transistor 120 is to be switched again from the conductive state to the non-conductive state by the driver signal 920 to turn off the light-emitting diode 110 and terminate the emission of electromagnetic radiation by the light-emitting diode 110.

To design the turning off of the light-emitting diode 110 to have a short fall time, the second transistor 230 of the discharge circuit 200 of the circuit arrangement 800 is switched from the non-conductive state to the conductive state at a second point in time 912 between the first point in time 911 and the third point in time 913 by the discharge signal 930. As a result, as of the second point in time 912, an increasing discharge current 940 is made possible via the series circuit of the discharge circuit 200 of the circuit arrangement 800 formed from the first resistor 210, the coil 220, and the second transistor 230.

The discharge current 940 increases at a time constant determined by the quotient of the inductance of the coil 220 and the resistance of the first resistor 210. If a time interval 915 elapsing between the second point in time 912 and the third point in time 913 is chosen to be at least three times larger than this time constant, the discharge current 940 flowing through the coil 220 of the discharge circuit 200 of the circuit arrangement 800 has reached an essentially constant maximum value at the third point in time 913.

After the first transistor 120 switches from the conductive state to the non-conductive state at the third point in time 913, the discharge current 940 flowing through the coil 220 of the discharge circuit 200 of the circuit arrangement 800 flows into the light-emitting diode 110 and there effects a rapid reduction of the charge carriers in the active zone of the light-emitting diode 110 and thus a rapid termination of the emission of electromagnetic radiation.

The discharge current 940 flowing in the coil 220 of the discharge circuit 200 subsides over time 910. At a fourth point in time 914 temporally subsequent to the third point in time 913, the second transistor 230 of the discharge circuit 200 of the circuit arrangement 800 may again be transferred from the conductive state to the non-conductive state by the discharge signal 930. Subsequently, the switching signal sequence explained based on the switching diagram 900 may run once again.

My circuit arrangements, assemblies and methods are illustrated and described in greater detail based on the preferred examples. However, this disclosure is not limited to the disclosed examples. Rather, other variations may be derived from them by those skilled in the art, without departing from the scope of protection of the disclosure.

This application claims priority of DE 10 2013 221 753.6, the subject matter of which is incorporated herein by reference.

The invention claimed is:

1. A circuit arrangement that actuates an optoelectronic component comprising a first node, a second node, a third node, and a fourth node,
   wherein a supply voltage is configured to be applied between the first node and the fourth node,
   the first node connects to the second node, the optoelectronic component is configured to be arranged between the second node and the third node,
a first transistor is arranged between the third node and the fourth node to switch a channel between the third node and the fourth node, and
a series circuit including a first resistor, a coil and a second transistor arranged between the first node and the third node, and is connected in parallel with the optoelectronic component.

2. The circuit arrangement as claimed in claim 1, wherein the second transistor is a normally off p-channel field-effect transistor.

3. The circuit arrangement as claimed in claim 1, wherein the first transistor is a normally off n-channel field-effect transistor.

4. The circuit arrangement as claimed in claim 1, wherein the first node connects to the second node via a parallel circuit made up of a second resistor and a capacitor.

5. The circuit arrangement as claimed in claim 1, wherein the circuit arrangement includes a driver circuit that actuates the first transistor.

6. A light-emitting diode assembly comprising the circuit arrangement as claimed in claim 1, and a light-emitting diode arranged between the second node and the third node of the circuit arrangement.

7. The light-emitting diode assembly as claimed in claim 6, wherein the light-emitting diode emits light in the infrared spectral range.

8. The light-emitting diode assembly as claimed in claim 6, wherein a protective diode is arranged between the second node and the third node, antiparallel to the light-emitting diode.

9. A method of actuating the optoelectronic component by the circuit arrangement as claimed in claim 1 comprising:
turning on the first transistor at a first point in time;
turning on the second transistor at a second point in time after the first point in time; and
turning off the first transistor at a third point in time after the second point in time.

10. The method as claimed in claim 9, wherein there is a time interval between the second point in time and the third point in time which is at least three times larger than a time constant determined by a quotient of inductance of the coil and resistance of the first resistor.

11. The method as claimed in claim 9, further comprising:
turning off the second transistor at a fourth point in time after the third point in time.

* * * * *